United States Patent Office 3,427,369
Patented Feb. 11, 1969

3,427,369
CARBON GUN MIXES
Joseph R. Parsons, Park Forest, Ill., assignor to Chicago Fire Brick Company, Chicago, Ill., a corporation of Illinois
No Drawing. Filed Dec. 16, 1966, Ser. No. 602,118
U.S. Cl. 264—30    10 Claims
Int. Cl. C04b 35/52; B44d 1/094

ABSTRACT OF THE DISCLOSURE

A mixture of particles of carbon and particles of a gel or gel forming material which with water forms a temporary bonding medium for the carbon. Pitch may also be present to serve as a permanent bond. Ordinary plastic clays may be used in place of the gel material but must be present in higher proportion than the gel.

---

The invention relates to mixtures of carbon particles and hydrophilic binders suitable as gun mixes for quick repair and maintenance of carbon block, runners, troughs, tap holes, slag notches and other locations in furnaces where molten iron or other metals come in contact with refractories.

"Gunning" is the name applied to a refractory installation process wherein a loose, graded refractory composition is blown from a nozzled conduit or "gun" under 30–100 p.s.i. air pressure, is mixed with water as it exits from the nozzle to form tacky particles, and then impacts and adheres to a surface. Repeated passes of the material stream across the surface yield a monolithic section of a heat resistant lining.

Some so called carbon gunning mixes have been made using 10–20% carbon and regular fire clay grogs. These contain carbon in too small proportions for satisfactory temperature resistance.

An object of this invention is to provide carbon gun mixes, particularly those having 50% to 100% carbon, capable of facing carbon block or replacing them completely.

Normal procedures for the manufacture of carbon block (which my new carbon gun mixes are repairing and replacing) are as follows:

Calcined coke is ground fine and mixed with hot pitch to form a plastic mass. This plastic mass is then pressed or rammed into suitable forms to make blocks and allowed to cool slowly for the pitch to set. These large blocks are then packed in loose coke to prevent oxidation and then given a long slow fire (usually 10 to 20 days) until it reaches a temperature of 2300° to 2500° F.

To successfully make a carbon gun mix, carbon particles must be made to stick to a vertical carbon block and be quickly dried and put into service. As carbon is non-wetting to most materials, this offers a series of problems to the gunning of this material.

In accordance with one embodiment of this invention particles of carbon such as graphite, calcined hard coals, and calcined coke are used with a bonding amount of an organic gel such as gum arabic, gum karaya, gum tragacanth, pre-cooked starches, lignins, methyl cellulose and other materials which are or form hydrophilic gels. These gels are temporary bonding agents which bind and coat the carbon when water is added at the gun nozzle during the gunning operation.

Preferably coal tar pitches are also added to the mixture. These melt and carbonize and if heated high enough will graphitize, forming an excellent high temperature permanent bond.

With organic gel binders the composition may be as high as 90% carbon before use, and 100% carbon after use in the furnaces.

Inorganic gels and gel forming material such as bentonite, silica gel and water soluble silicates such as sodium or potassium silicates may be used in place of the organic gels but with these 100% carbon can not be obtained.

Also ordinary plastic clay of the kaolinite or illite type may be used but in this case 50–60% carbon content is about as high as can be attained.

The use of temporary bonds such as above described makes possible a fast set of the pitch. The temporary bonds must be good enough and in sufficient quantity to allow the pitch to boil violently before it carbonizes and becomes the final bond. From 3–12% by weight of an organic gel gives highly satisfactory results.

I have found that various forms of carbon bond quite differently, but all can be used.

Graphite and calcined hard coals are quite dense and pitch does not penetrate giving only a surface bond to these aggregates. The range of pitch required is usually only 10 to 15%. However, calcined petroleum cokes are porous and 20 to 25% pitch seems to be required to develop a maximum bond. As graphite and calcined coal, due to their density, are more desirable, I have discovered that small amounts of pulverized petroleum coke (15 to 20%) mixed therewith greatly improves the bonding strength of both graphites and calcined coal aggregates.

The proportion of carbon particles to gel binder is such as to retain the carbon particles in place on the surface to be repaired on impact without substantial expansion after impact. Suitable ratios of gels to carbon are from about 5–15 parts by weight of organic or inorganic gels for 100 parts by weight of carbon. With ordinary clays the ratio ranges from about 40–100 parts by weight of clay for 100 parts by weight of carbon. The pitch may suitably be present in 0–20 parts by weight per 100 parts of carbon.

Also the particle size of the carbon should not be so coarse as to give rebounding during gunning or contain so many fines as to substantially all blow away during gunning. Particle sizes of one-quarter (¼) inch diameter and finer are suitable, with preferably approximately 25–30% of −4+8 mesh and 25–30% of −100 mesh, the latter including the binder.

I have found that carbon blocks or shapes should be cleaned before gunning. This is easily done by running a little sand through the gun and sand blasting the surface. As carbon burns, a film of ash forms which should be removed before building up the surface.

The following are examples of suitable gun mixes made in accordance with this invention:

EXAMPLE 1

Covers several selected carbon gun mixes over a range of temperatures to show the behavior of such mixes when fired to various temperatures.

EXAMPLE 2

Covers carbon gun mixes in the 50–60% carbon range and here the clay contents can be so high they do not need the gelling action obtained with bentonite and organic gels.

EXAMPLE 3—(70–75% MIXES)

Here, a combination of bentonite and high grade plastic clays suffice to retain the carbon.

EXAMPLE 4

Here, bentonite and high grade plastic clays suffice to form the temporary bonding medium of the carbon grain.

EXAMPLE 5

Here small amounts of bentonite or organic gels form the total temporary bonding medium to produce carbon gunning mixes of 90 to 100% carbon.

In all of the following examples the ingredients may be mixed by means of commercially available mixers such as paddle blade mixer, Muller mixer, or a concrete mixer.

In the examples the amounts are given in parts by weight after the materials.

EXAMPLE #1

| Materials | 1 | 2 | 3 |
|---|---|---|---|
| Graphite ¼" and fines | | | 57 |
| Calcined Petroleum coke ¼ on 28 mesh | 40 | 45 | |
| Carbon sand | 20 | | |
| Calcined Petroleum coke 60 mesh | 10 | 15 | 15 |
| Blast Furnace pitch | | 20 | 15 |
| Ball clay | | 15 | |
| Bentonite (Western) | 5 | 5 | 10 |
| Ohio plastic clay | 25 | | |
| Lignin Binder | | | 3 |
| 7M Asbestos fiber | | 1.5 | |

| Physical Properties | Temperature, °F. | 1 | 2 | 3 |
|---|---|---|---|---|
| Weight/cu. ft | 220 | 93.3 | 84.5 | 102.4 |
| | 1,000 | 89.3 | 81.2 | 89.3 |
| | 2,500 | 87.5 | 79.9 | 76.6 |
| Modulus of Rupture | 220 | 324 | 438 | 501 |
| | 1,000 | 513 | 526 | 582 |
| | 2,500 | 459 | 437 | 484 |
| Cold crushing str., p.s.i. | 220 | 1,251 | 1,397 | 1,231 |
| | 2,500 | 794 | 400 | 797 |
| Shrinkage | 220 | 0.00 | +0.15 | −0.15 |
| | 1,000 | +0.04 | +0.11 | +0.18 |
| | 2,500 | −0.44 | −0.33 | −0.29 |

EXAMPLE #2

| Materials | 4 | 5 | 6 |
|---|---|---|---|
| Graphite ¼ on 20 mesh | 40 | | |
| Calcined Petroleum Coke ¼ and fines | | 40 | |
| Calcined Hard Coal ¼" and fines | | | 40 |
| Ohio Plastic Clay | 40 | 40 | 40 |
| Blast Furnace Pitch | 20 | 20 | 20 |

| Physical Properties | Temp., °F. | 4 | 5 | 6 |
|---|---|---|---|---|
| Weight/cu. ft | 1,000 | 90.3 | 82.8 | 84.5 |
| Modulus of Rupture | 1,000 | 267 | 575 | 401 |
| Shrinkage | 1,000 | +.04 | −.04 | +.11 |
| Loss on firing | 1,000 | 12.2% | 10.1% | 10.1% |

EXAMPLE #3

| Materials | 7 | 8 | 9 | 10 |
|---|---|---|---|---|
| Graphite ¼ and fines | 40 | | | |
| Calcined Hard Coal ¼ on 28 mesh | | 40 | | 40 |
| Calcined Petroleum Coke ¼ and fines | | | 40 | |
| Carbon Sand | 20 | 20 | 20 | 20 |
| Blast Furnace Pitch | 10 | 10 | 10 | 20 |
| Bentonite | 5 | 5 | 5 | 5 |
| Ohio Plastic | 25 | 25 | 25 | |
| Ball Clay | | | | 15 |

| Physical Properties | Temp., °F. | 7 | 8 | 9 | 10 |
|---|---|---|---|---|---|
| Weight per cu. ft | 1,000 | 100 | 93.4 | 89.3 | 85.9 |
| Modulus of Rupture | 1,000 | 476 | 402 | 513 | 616 |
| Shrinkage | 1,000 | 0.00 | 0.15 | 0.00 | +0.33 |
| Loss on firing | 1,000 | 3.23% | 2.13% | 2.68% | 6.39% |

EXAMPLE #4

| Materials | 11 | 12 | 13 | 14 |
|---|---|---|---|---|
| Graphite ¼ and fines | 45 | | | |
| Calcined Hard Coal ¼ and fines | | 45 | | |
| Calcined Petroleum Coke ¼ and fines | | | 45 | |
| Carbon Sand | | | | 45 |
| Blast Furnace Pitch | 20 | 20 | 20 | 20 |
| Calcined Pet. Coke 60 mesh | 15 | 15 | 15 | 15 |
| Bentonite (Western) | 5 | 5 | 5 | 5 |
| Ball Clay | 15 | 15 | 15 | 15 |
| 7M Asbestos | 1.5 | 1.5 | 1.5 | 1.5 |

| Physical Properties | Temp., °F. | 11 | 12 | 13 | 14 |
|---|---|---|---|---|---|
| Weight/cu. ft | 1,000 | 90.7 | 82.7 | 81.2 | 75.6 |
| Modulus of Rupture | 1,000 | 443 | 411 | 526 | 312 |
| Shrinkage | 1,000 | +0.07 | +0.11 | +0.11 | +0.26 |
| Loss on Firing | 1,000 | 8.39% | 10.25% | 6.22% | 8.65% |

EXAMPLE #5

| Materials | 15 | 16 | 17 | 18 |
|---|---|---|---|---|
| Graphite ¼ and fines | 57 | | | 65 |
| Calcined Hard Coal ¼ and fines | | 57 | | |
| Calcined Petroleum Coke ¼ and fines | | | 57 | |
| Carbon Sand | | | | |
| Blast Furnace Pitch | 15 | 15 | 15 | 10 |
| Bentonite (Western) | 10 | 10 | 10 | |
| Lignin | 3 | 3 | 3 | 3 |
| Calcined Coke 60 mesh | 15 | 15 | 15 | 15 |
| Gum Arabic | | | | 4 |
| Cooked Starch | | | | 3 |

| Physical Properties | Temp., °F. | 15 | 16 | 17 | 18 |
|---|---|---|---|---|---|
| Weight/cu. ft | 1,000 | 89.3 | 80.4 | 78.8 | 77.4 |
| Modulus of Rupture | 1,000 | 482 | 366 | 562 | 296 |
| Shrinkage | 1,000 | +0.18 | +0.07 | +0.04 | −0.24 |
| Loss on firing | 1,000 | 6.52% | 9.97% | 5.09% | 9.8% |

In Example 6 the pulverized calcined coke seems to retain and absorb the pitch giving a stronger body. This system of improving body strength is used throughout the examples given.

EXAMPLE #6

| Materials | 19 | 20 | 21 |
|---|---|---|---|
| Graphite ¼ on 20 mesh | 60 | 50 | 40 |
| 60 mesh calcined coke | 0 | 10 | 20 |
| Bentonite (Western) | 5 | 5 | 5 |
| Ball Clay | 15 | 15 | 15 |
| Blast Furnace pitch | 20 | 20 | 20 |

| Physical Properties | Temp., °F. | 19 | 20 | 21 |
|---|---|---|---|---|
| Weight per cu. ft | 1,000 | 89.1 | 85.8 | 83.3 |
| Modulus of Rupture | 1,000 | 298 | 346 | 366 |
| Shrinkage | 1,000 | +.22 | −0.05 | +0.11 |
| Loss on firing | 1,000 | 9.28% | 11.22% | 11.84% |
| Percent increase in strength | | | 16% | 25% |

The following screen analysis in Table 1 is for the specific formulae in Examples 1, 2, and 3 but could be present in all of the compositions of all the examples and is typical of the compositions of this invention.

TABLE 1

| Screen Number (Tyler) | Screen Analysis, Percent by Weight | | |
|---|---|---|---|
| | Example #1 | Example #2 | Example #3 |
| | Formula #3 | Formula #4 | Formula #8 |
| −4+8 mesh | 30 | 26 | 22 |
| −8+10 mesh | 10 | 8 | 9 |
| −10+14 mesh | 6 | 7 | 6 |
| −14+20 mesh | 6 | 6 | 8 |
| −20+28 mesh | 6 | 5 | 6 |
| −28+35 mesh | 4 | 4 | 2 |
| −35+65 mesh | 7 | 10 | 16 |
| −65+100 mesh | 4 | 6 | 8 |
| −100 mesh | 27 | 28 | 23 |

In the above analysis the gel material in dry form is present in 60 mesh and finer. While the analysis is that for the entire composition it would be essentially the same (except for smaller proportion of fines) for the carbon particles.

The following is an example of an application of the compositions:

After a water cooled iron cupola lined with carbon block has been in service a week, the bottom is dropped and it is repaired for another week's work. The ash and slag is cleaned from the carbon block by lightly sand blasting it with sand run through a gunning machine which can be one of several commercial units available. Then the carbon block is built up one to two inches to replace the week's wear using any of the composition of the above examples, and applying the composition with a "gun" as known to the art wherein water is introduced to the stream of composition as it exits from the nozzle of the "gun." The water is added in sufficient amount to allow the dry particles of gel or gel forming material to expand quickly and become sufficiently tacky to coat and retain the coarse particles of carbon on the surface to which the composition is applied. The air pressure varies based on the size of the cupola, but the general range is 30 to 100 p.s.i. (gage). After gunning with any of the compositions of the above examples the bottom is replaced and the cupola is ready for another week's work. The expensive carbon block is thus protected by a new easily placed surface.

Gel-forming materials such as bentonite, methyl cellulose, gum arabic and like gums may also be called gels since in their normal powdered solid state they contain sufficient water (even though substantially dry) to have a gel structure while being capable of taking up more water to become more gelatinous and tacky.

I claim:

1. In a process of applying a refractory composition to a carbon surface to form a refractory monolith on said surface wherein particles of the refractory composition are forced through a conduit and out of a nozzle in a stream and water is added to the stream, the improvement in which the refractory composition compises particles of carbon and particles of a substantially dry hydrophilic gel, the proportion of hydrophilic gel to carbon being in the ratio of 5–15 parts by weight of gel to 100 parts by weight of carbon, and the water being added in sufficient amount to allow the gel particles to become tacky on the addition of the water and causes the adhesion of the composition to the carbon surface.

2. The process of claim 1 in which the hydrophilic gel is selected from the group consisting of water soluble organic gums, pre-cooked starches, lignins, methyl cellulose, bentonite, and plastic clays.

3. The process of claim 1 wherein the refractory composition also contains a minor amount of pitch.

4. The process of claim 1 wherein the hydrophilic gel is bentonite.

5. The process of claim 1 wherein the hydrophilic gel is an organic gel selected from the group consisting of water soluble organic gums, pre-cooked starches, lignins, and methyl cellulose.

6. The process of claim 1 wherein the hydrophilic gel is a water soluble organic gum.

7. The process of claim 1 wherein the hydrophilic gel is methyl cellulose.

8. The process of claim 1 wherein the hydrophilic gel is a plastic clay in the ratio of 40–100 parts by weight of clay to 100 parts by weight of carbon.

9. The process of claim 1 wherein the particle size of the carbon is not more than ¼ inch diameter.

10. The process of claim 1 wherein the carbon is selected from the group consisting of graphite, calcined hard coal, and calcined fine coke mixed with calcined petroleum coke having a particle size of not greater than 60 mesh.

References Cited

UNITED STATES PATENTS

| 2,521,495 | 9/1950 | Wilhelm et al. | 106—56 |
| 2,812,275 | 11/1957 | Francisco et al. | 106—56 |
| 2,890,128 | 6/1959 | Bushong et al. | 106—56 |
| 2,948,627 | 8/1960 | Feild | 106—56 |

JAMES E. POER, *Primary Examiner.*

U.S. Cl. X.R.

106—56